Figure 1:
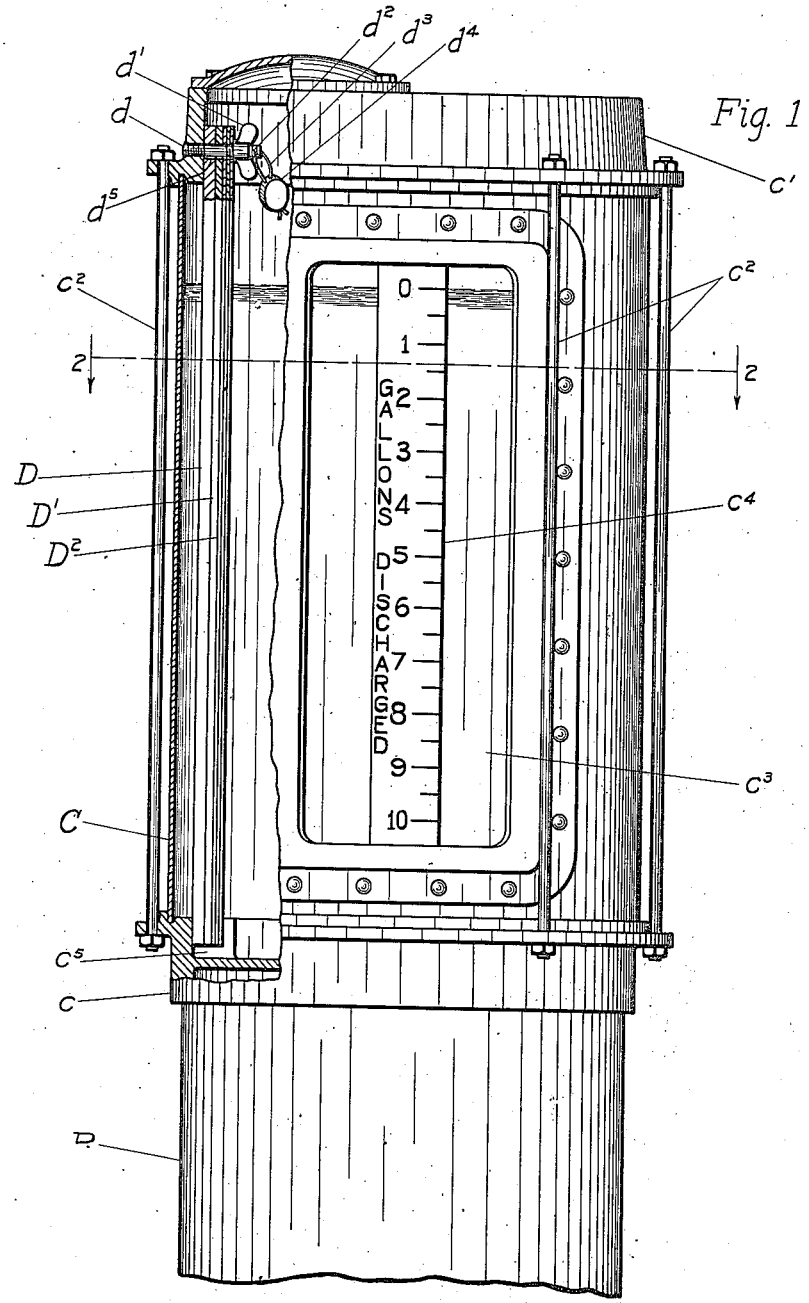

June 5, 1923.

L. E. BAKER

DISPLACEMENT ELEMENT FOR LIQUID CONTAINERS

Filed Nov. 10, 1919

1,457,811

2 Sheets-Sheet 1

INVENTOR.

June 5, 1923.
L. E. BAKER
1,457,811
DISPLACEMENT ELEMENT FOR LIQUID CONTAINERS
Filed Nov. 10, 1919  2 Sheets-Sheet 2
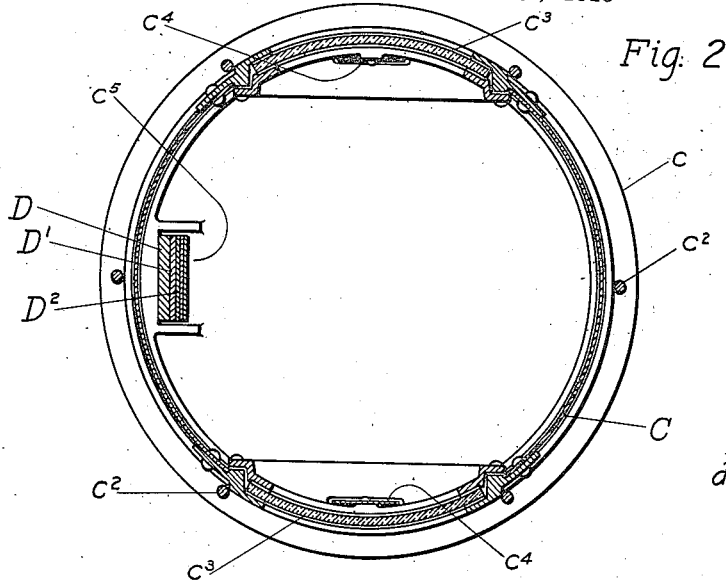
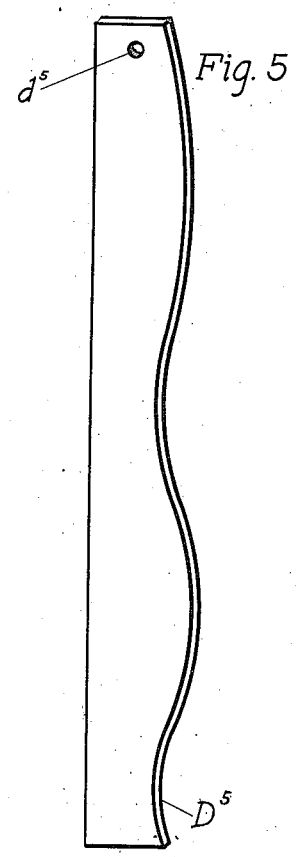
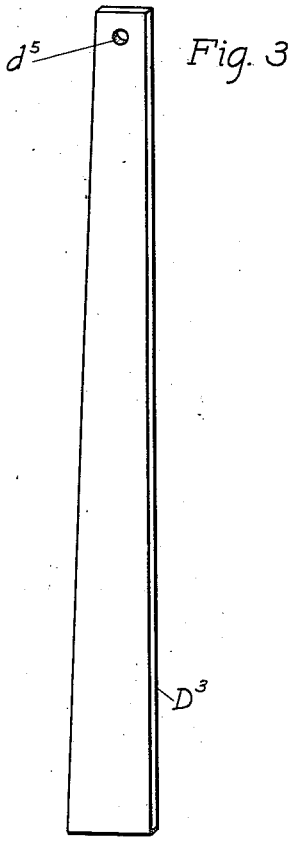
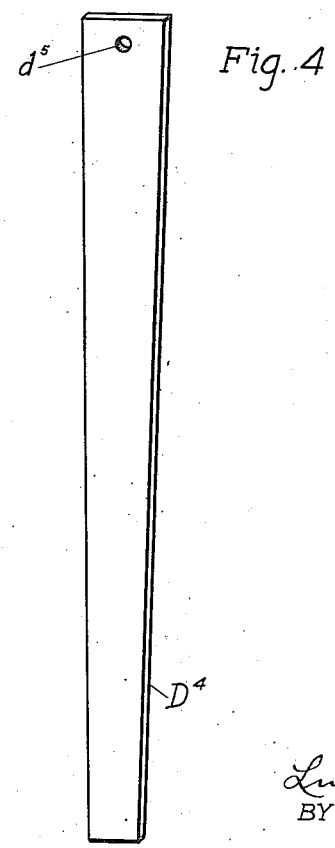
INVENTOR
Linnaeus E. Baker
BY Walter A. Knight
ATTORNEYS

Patented June 5, 1923.

1,457,811

UNITED STATES PATENT OFFICE.

LINNAEUS E. BAKER, OF FORT WAYNE, INDIANA, ASSIGNOR TO WAYNE OIL TANK AND PUMP COMPANY, OF FORT WAYNE, INDIANA, A CORPORATION OF INDIANA.

DISPLACEMENT ELEMENT FOR LIQUID CONTAINERS.

Application filed November 10, 1919. Serial No. 337,004.

*To all whom it may concern:*

Be it known that I, LINNAEUS E. BAKER, a citizen of the United States, residing at Fort Wayne, in the county of Allen and State of Indiana, have invented new and useful Improvements in Displacement Elements for Liquid Containers, of which the following is a specification.

My invention relates to displacement elements for liquid measuring vessels. and are designed to make possible accurate measurement therein by the use of a standard linear scale.

Heretofore it has been necessary to ensure exact measurement in containers having a standard scale to make such containers with uniformly accurate side walls, which is impractical at least in the cheaper vessels. To ensure accurate measurement the graduations have been put upon each vessel separately by calibration.

My invention consists in inserting in a vessel having a standard linear scale and a minimum diameter greater than is required for said scale, one or more displacement elements to reduce the cross sectional liquid area of said vessel so that all quantities measured therein will accord with the quantites indicated on the scale.

By the use of my invention standard measuring vessels that must be passed by sealers of measures from time to time, may be corrected as to their various cross-sectional areas by such public officers quickly and cheaply wherever installed for use.

In the particular embodiment of my invention selected for illustration: the vessel to contain and measure the liquid is the elevated container of a so-called visible dispensing apparatus for gasoline.

Figure 1, is an elevation of the container with parts broken away to show the displacement elements in position therein, Fig. 2, is a cross-section on the line 2—2 of Figure 1, Fig. 3, a detail, is a perspective of a wedge shaped displacement element to correct a conical shaped container whose lower end is largest, Fig. 4, a detail, is a perspective of a wedge shaped displacement element to correct a conical shaped contanier whose upper end is largest, and Fig. 5, a detail, is a perspective of a displacement element originally of uniform rectangular cross-section, but cut to equalize the cross-sectional liquid area at all points on the scale.

Referring now to the drawings P, is the pedestal on which the bottom $c$, of the liquid container C, rests. The container has its minimum cross-sectional area greater than is required by the units of the scale $c^4$, hereinafter to be described. The top $c^1$, is secured to the bottom $c$, by tie rods $c^2$, and the joints are made leak tight with litharge or in any other suitable manner.

The container C, here shown is made of metal with windows $c^3$, of glass or other transparent material, and at a convenient point on or near this window is a standard linear scale $c^4$, graduated to gallons and half gallons from 0 to 10 to indicate the quantity of gasoline discharged from the container.

On the top $c^1$, at a convenient point on its side is a horizontal nonremovable threaded stud $d$, provided with a nut $d^1$, and a hole $d^2$, through which may be passed the wire $d^3$, of a standard seal $d^4$, to prevent the unauthorized addition, removal or exchange of displacement elements D, $D^1$, $D^2$, suspended through holes $d^5$, from the stud $d$.

The displacement elements are held in alignment by the recess $c^5$, formed in the bottom $c$. The displacement elements are of any suitable material and of any shape necessary alone or in combination to make the liquid cross sectional area of the container the same at all points on the scale and to conform to the standard of the scale. For instance, if the container C, is not a cylinder or other form having a uniform cross-sectional area, or is not conical, a displacement element $D^5$, similar to that shown in Figure 5 may be used to equalize all cross sectional areas, and then one or more plain elements of uniform rectangular cross-section like D, $D^1$, $D^2$, may be added to make the several equal cross-sectional areas of the container conform to the standard of the scale. If the container C, is conical, or if its cross-sectional area from graduation to graduation conforms to that of a conical container, then a wedge shaped displacement element $D^3$, $D^4$, like those shown in Figs. 3 and 4 may be used, the former if the container is larger at the bottom; the latter if larger at the top, to equalize all cross-sectional areas, and then one or more elements of uniform cross-sectional area may be used to make each of the equal cross-sectional areas of the container conform to the standard of the scale.

When so corrected by the displacement elements, if the surface of the liquid in the container C, stood at 5 on the scale and five more gallons of liquid were placed in the container the surface of the liquid would stand at 0, on the scale. Then if three gallons were withdrawn from the container, the surface of the liquid would stand at 3, on the scale, etc.

Obviously the same result may be attained by substituting for the several displacement strips necessary to make the correction, a single displacement element having the same cross-sectional characteristics as the several combined strips.

The shape of the displacement elements is immaterial so long as the various desired cross-sectional areas are obtained.

The displacement element or elements used may be held in place in the container in any convenient manner.

I claim as my invention and desire to secure by Letters Patent of the United States:

1. In combination with a dispensing measuring vessel having different cross sectional areas and having a standard scale to indicate the quantity of liquid therein; displacement means secured within the vessel and so shaped as to make the cross sectional areas thereof uniform and correct the reading on the scale.

2. In combination with a dispensing measuring vessel of uniform cross sectional area and having a standard scale to indicate the quantity of liquid therein; one or more displacement strips secured within the vessel, said strips shaped to make the cross sectional area thereof uniform and conformable to the reading on the scale.

In testimony whereof I have hereunto set my hand in presence of two subscribing witnesses.

LINNAEUS E. BAKER.

Witnesses:
F. J. WEMHOFF,
L. H. PARROT.